(12) United States Patent
Wang et al.

(10) Patent No.: US 8,345,314 B2
(45) Date of Patent: Jan. 1, 2013

(54) METHODS AND SYSTEMS TO EMBED GLOSSMARK DIGITAL WATERMARKS INTO CONTINUOUS-TONE IMAGES

(75) Inventors: Shen-Ge Wang, Fairport, NY (US); Reiner Eschbach, Webster, NY (US); William A. Fuss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 392 days.

(21) Appl. No.: 12/276,851

(22) Filed: Nov. 24, 2008

(65) Prior Publication Data

US 2010/0128321 A1    May 27, 2010

(51) Int. Cl.
*H04N 1/40* (2006.01)

(52) U.S. Cl. .................. 358/3.28; 358/540; 358/469

(58) Field of Classification Search .................. None
See application file for complete search history.

(56) References Cited

U.S. PATENT DOCUMENTS

| | | | |
|---|---|---|---|
| 4,210,346 A | 7/1980 | Mowry, Jr. et al. | |
| 5,695,220 A | 12/1997 | Phillips | |
| 5,734,752 A * | 3/1998 | Knox | 358/3.28 |
| 6,108,512 A | 8/2000 | Hanna | |
| 7,092,128 B2 * | 8/2006 | Wang et al. | 358/3.06 |
| 7,126,721 B2 * | 10/2006 | Wang et al. | 358/3.06 |
| 7,148,999 B2 * | 12/2006 | Xu et al. | 358/3.06 |
| 7,180,635 B2 * | 2/2007 | Wang et al. | 358/3.06 |
| 7,193,751 B2 * | 3/2007 | Wang et al. | 358/3.06 |
| 7,301,675 B2 * | 11/2007 | Wang et al. | 358/3.06 |
| 7,304,770 B2 * | 12/2007 | Wang et al. | 358/3.06 |
| 7,324,241 B2 * | 1/2008 | Eschbach et al. | 358/1.9 |
| 7,352,493 B2 * | 4/2008 | Liu et al. | 358/3.06 |
| 7,382,495 B2 * | 6/2008 | Liu et al. | 358/3.06 |
| 7,391,537 B2 * | 6/2008 | Eschbach et al. | 358/3.06 |
| 7,589,865 B2 * | 9/2009 | Eschbach et al. | 358/1.9 |
| 7,639,400 B2 * | 12/2009 | Hains | 358/3.06 |
| 7,656,556 B2 * | 2/2010 | Wang | 358/2.1 |
| 7,813,006 B2 * | 10/2010 | Liu et al. | 358/3.06 |
| 8,189,246 B2 * | 5/2012 | Washino | 358/540 |
| 8,248,661 B2 * | 8/2012 | Wang et al. | 358/3.06 |
| 2003/0231349 A1 * | 12/2003 | Wang et al. | 358/3.06 |
| 2005/0031160 A1 * | 2/2005 | Shaked et al. | 382/100 |
| 2006/0127117 A1 | 6/2006 | Eschbach et al. | |
| 2007/0177759 A1 | 8/2007 | Eschbach et al. | |
| 2007/0262579 A1 | 11/2007 | Bala et al. | |
| 2007/0264476 A1 | 11/2007 | Bala et al. | |
| 2008/0192297 A1 * | 8/2008 | Wang et al. | 358/3.06 |

* cited by examiner

*Primary Examiner* — Dung Tran

(74) *Attorney, Agent, or Firm* — Fay Sharpe LLP

(57) ABSTRACT

Disclosed are methods/systems to embed a watermark into a contone image. Specifically, the disclosed methods and systems spatially modulate a contone image substantially adjacent a watermark area according to a first polarization and spatially modulate the contone image substantially within the watermark area according to a second polarization. These spatially modulated images may then be subsequently processed, stored, communicated and/or rendered.

19 Claims, 9 Drawing Sheets

METHODS AND SYSTEMS TO EMBED GLOSSMARK DIGITAL WATERMARKS INTO CONTINUOUS-TONE IMAGES

CROSS REFERENCE TO RELATED PATENTS AND APPLICATIONS

U.S. Pat. No. 7,092,128, issued Aug. 15, 2006 to Wang et al., entitled "APPLICATION OF GLOSSMARKS FOR GRAPHICS ENHANCEMENT; U.S. Pat. No. 7,126,721, issued Oct. 24, 2006 to Wang et al., entitled "PROTECTING PRINTED ITEMS INTENDED FOR PUBLIC EXCHANGE WITH GLOSSMARKS; U.S. Pat. No. 7,148,999, issued Dec. 12, 2006 to Xu et al., entitled "VARIABLE GLOSSMARK"; U.S. Pat. No. 7,180,635, issued Feb. 20, 2007 to Wang et al., entitled "HALFTONE IMAGE GLOSS CONTROL FOR GLOSSMARKS"; and U.S. Pat. No. 7,193,751, issued Mar. 20, 2007 to Wang et al., entitled "TAG CONTROL FOR RUNTIME GLOSSMARKS" are totally incorporated herein by reference.

BACKGROUND

The present disclosure relates generally to watermarking technology where a special visual effect is produced by creating different levels of gloss within an image. More particularly, this disclosure relates to a method and system for embedding a gloss watermark into a contone image.

In general, watermarks are used to protect against the copying of a document. Ideally, the content of the watermark is readily observable by a human reader but not reproducible with a copier or scanner. One approach used to produce watermarks is to print an image using clear toner or ink. The clear toner or ink have the effect of producing an image where reflected and diffused light associated with the watermark and detected by an observer changes depending on the angle of view, where the observer can discern the content of the watermark by holding the document at an angle, but the watermark is not detectable by a copier or scanner which is restricted to detecting the image with light reflected at right angles to the document.

Other methods and/or systems to produce watermarks or printed documents which can be read, but not copied, include the following.

U.S. Pat. No. 4,210,346, issued to Mowry et al., and U.S. Pat. No. 5,695,220, issued to Phillips, disclose methods to use a particular white toner and a particular white paper that are designed to have different diffused light characteristics at different angles of view. These systems require specially matched paper and toner.

U.S. Pat. No. 6,108,512, issued to Hanna, discloses a system for producing non-copyable printing in a xerographic printer, where text is printed using clear toner. This system provides a printed document where the optical differences are detectable due to reflectivity differences between the toner and non-toner portions of the printed page. The plastic-clear toner used reflects more light than the paper so a human can read the image by holding the page at an angle where a contrast appears between the lighter appearing toner and the darker appearing paper. However, a copier or scanner is configured to supply light at an oblique angle incident to the printed document and the copier or scanner detects diffused light reflected at a right angle to the document. This system produces diffused light which is approximately equal for both the toned and un-toned surfaces, and the scanner or copier will not be able to copy the original.

Another approach taken to provide copy control for a document includes digital watermarking. As an example, in U.S. Pat. No. 5,734,752, issued to Knox, there is disclosed a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

One drawback associated with the watermark methods and system discussed above is the need for special toners/inks and/or paper/substrates, or the requirement of the superimposition of additional prints to allow viewing of the watermark(s).

Other approaches to provide gloss watermarks which do not require these special toner/inks and/or paper/substrates are disclosed in U.S. Pat. No. 7,092,128, issued to Wang et al., and U.S. Pat. No. 7,180,635, issued to Wang et al. Those disclosures provide methods and systems for the manipulation of differential gloss as may be inherent in halftoned images. By selectively applying halftones with anisotropic structure characteristics which are significantly different in orientation, while remaining identical in density, a gloss image may be superimposed within an image without the need for special toners or paper and conventional copiers/scanners will not be able to copy the superimposed gloss image.

This disclosure provides methods and systems to embed texts, patterns, and/or binary images as gloss watermarks into contone (continuous-tone) black and white, or color images, as distinguished from embedding gloss watermarks at the image halftoning stage as disclosed in U.S. Pat. No. 7,092,128 and U.S. Pat. No. 7,180,635.

INCORPORATION BY REFERENCE

U.S. Pat. No. 4,210,346, issued Jul. 1, 1980 to Mowry, Jr. et al., entitled "PROTECTED DOCUMENT BEARING WATERMARK AND METHOD OF MAKING"; U.S. Pat. No. 5,695,220, issued Dec. 9, 1997 to Phillips, entitled "VISUAL VALIDATION MARK FOR BANK CHECKS AND OTHER SECURITY DOCUMENTS"; U.S. Pat. No. 6,108,512, issued Aug. 22, 2000 to Hanna, entitled "COPY PREVENTION METHOD"; U.S. Pat. No. 5,734,752, issued Mar. 31, 1998 to Knox, entitled "DIGITAL WATERMARKING USING STOCHASTIC SCREEN PATTERNS" are all totally incorporated herein by reference.

BRIEF DESCRIPTION

In one exemplary embodiment a method of embedding a watermark into a contone image is disclosed. The method comprises of receiving a data representation of a contone image; defining a watermark area within the contone image; spatially modulating the data representation of the contone image substantially adjacent the watermark area to produce a data representation of the respective contone image according to a first polarization; and spatially modulating the data representation of the contone image substantially within the watermark area to produce a data representation of the respective contone image according to a second polarization, thereby producing a contone data representation of the contone image with an embedded watermark.

In another exemplary embodiment of this disclosure, a computer program product is disclosed. The computer program product comprises a computer-usable data carrier storing instructions that, when executed by a computer, cause the computer to perform a method comprising receiving a data representation of a contone image; defining a watermark area within the contone image; spatially modulating the data representation of the contone image substantially adjacent the watermark area to produce a data representation of the respective contone image according to a first polarization; and spatially modulating the data representation of the contone image substantially within the watermark area to produce a data representation of the respective contone image according to a second polarization, thereby producing a contone data representation of the contone image with an embedded watermark.

In still another exemplary embodiment of this disclosure, an image data structure is disclosed which comprises a spatially modulated image data representation of a contone image substantially adjacent a watermark area according to a first polarization; and a spatially modulated image data representation of the contone image substantially within the watermark area according to a second polarization.

DETAILED DESCRIPTION

As briefly described in the background section, by proper utilization of the perceived differential gloss inherent between various anisotropic halftone dot structures, the desired manipulation of perceived gloss and the generation of gloss watermarks via that differential gloss may be achieved without the need for special papers, special toner or inks.

To better illustrate the gloss watermark process, a detailed description is provided below with reference to FIGS. 1-5.

Figure 1:
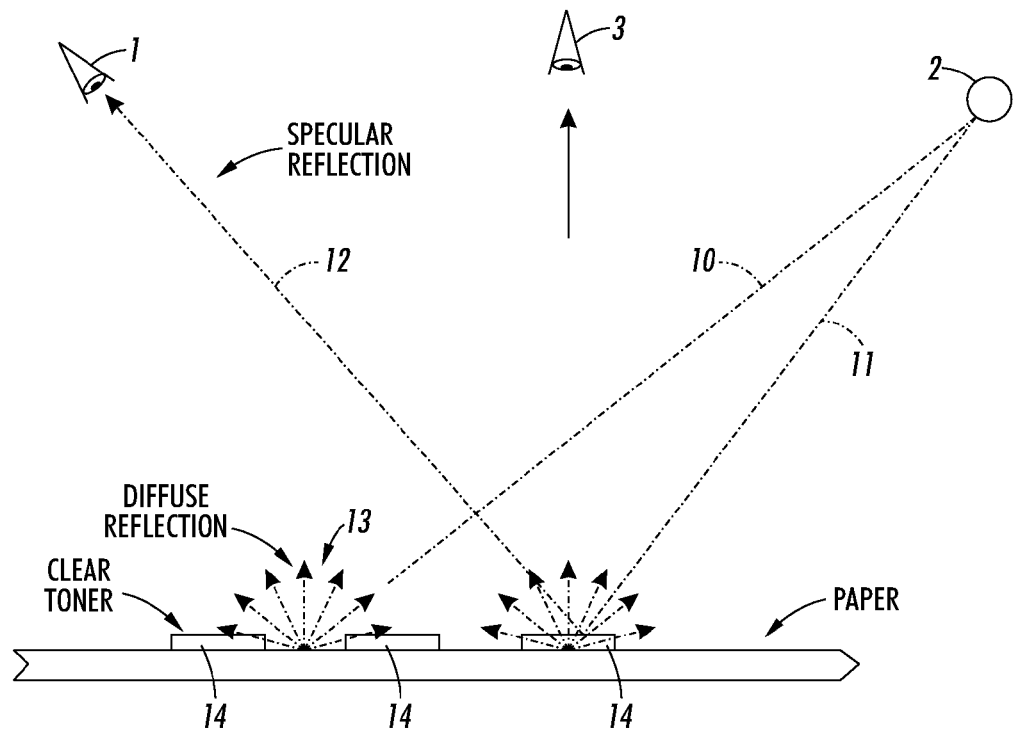
FIG. 1 shows how the human eye can detect a large difference between the glossy portions of a page, while a scanner detector cannot.

With reference to FIG. 1, depicted is how the human eye detects gloss upon a page where a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner cannot detect a difference. This is one manner for creating a gloss image which cannot be scanned by conventional copiers and scanners.

Figure 2:
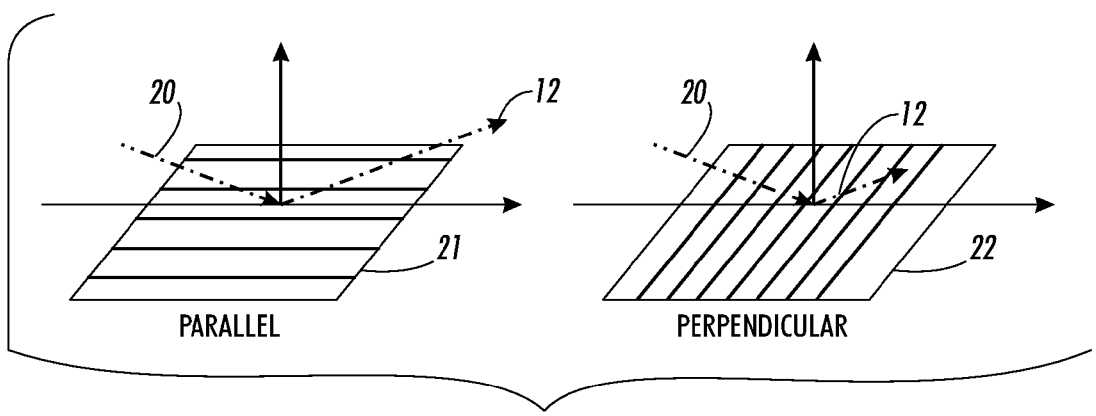
FIG. 2 depicts a differential gloss found in simple line-screen halftones.

The inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to an impinging incident light 20; a parallel orientation 21 and a perpendicular orientation 22. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 21. If as printed, a mass of the parallel orientation 21 halftones are butted directly adjacent to a mass of perpendicular orientation 22 halftones, there will be a difference in reflected light between them, which when viewed from an angle will be perceived as a shift in gloss differential or a glossmark. The perceptibility of this gloss differential will be maximized when the halftone anisotropic orientations are 90 degrees apart as shown here in FIG. 2.

Figure 3:
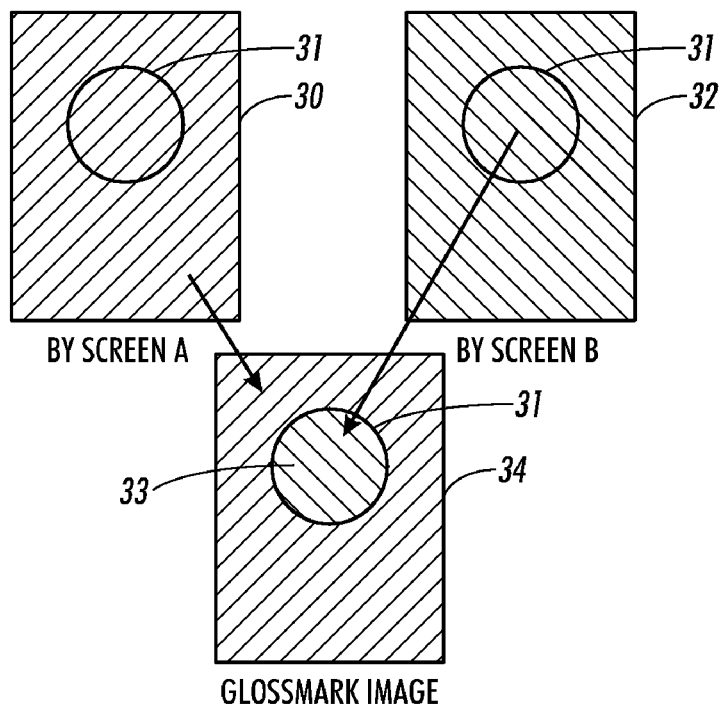
FIG. 3 depicts a patchwork alternating two halftone patterns to achieve a glossmark.

FIG. 3 depicts a glossmark image 34 achievable using halftone cells. Screen-A 30 uses one halftone cell type and screen-B 32 uses the other. The circle 31 is provided as a visual aid across the image screens 30, 32 and 34. The desired glossmark here is for a sphere 33 to be perceived in the midst of image 34. Screen-A 30 provides the field of right diagonal oriented anisotropic halftones and screen-B 32 provides the spherical area of left diagonal oriented anisotropic halftone cells. In this manner, a selection of the two screen types are patch-worked together to create the glossmark image 34.

Figure 4:
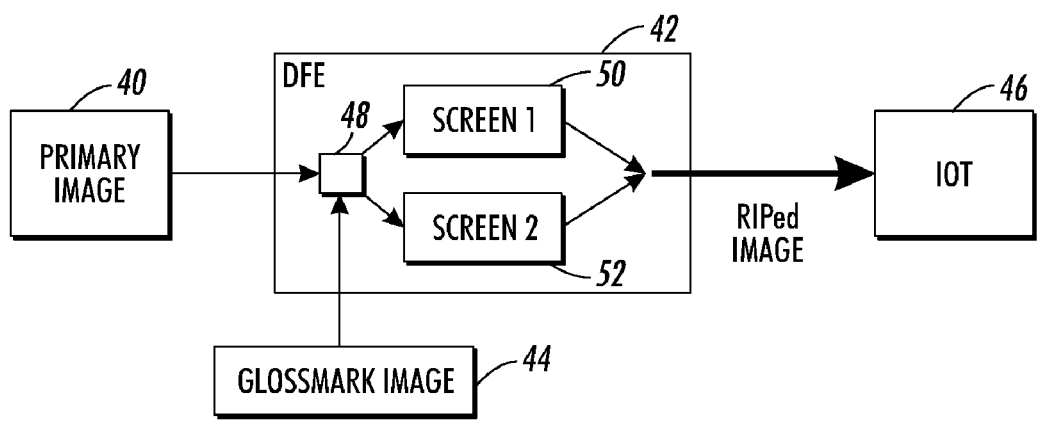
FIG. 4 illustrates an embodiment for achieving the image directed alternation of the halftone patterns for glossmarks as depicted in FIG. 3.

Another approach for the assembly of a glossmark image is diagramed in FIG. 4. Here, a primary image 40 is received as input data to a digital front-end (DFE) 42 as is normal. However, a desired glossmark image 44 is also received as input data to the DFE 42 as well. The processed image is sent to the image output terminal (IOT) 46 as a gray-scaled image, the halftone density being driven by the primary image 40 data. However, the halftone type selection is driven by the intended glossmark image data 44 as input to multiplexer switch 48. The intended glossmark image data 44 will serve to direct a portion of the primary image 40 to use a first anisotropic structured halftone while directing an alternative halftone to be used for the remainder of primary image 40. As will be understood by those skilled in the art, the intended glossmark image data 44 may be flattened into simple zero and one pixel data representations if needed in the DFE 42. This pattern of zero and ones are then used to toggle the multiplexer 48 to one halftone anisotropic structure orientation type or the other. Multiplexer 48 therefore toggles between either screen 1 type halftone 50 or screen 2 halftone type 52, as dictated by the desired glossmark data 44, to produce the composite result of raster input processed (RIP) image data as passed to the IOT 46. In this way, a superimposition of a glossmark image 44 pattern is imbedded into the primary image 40 which can only be perceived as gloss differential glossmark.

In summary, by alternating between two halftone types, carefully selected such that each has identical matching density characteristics while displaying distinctly different anisotropic structure orientations will enable the superimposition of a glossmark image without the need for special toners or paper. This manipulation of gloss differentials will, of course, be best utilized with toner/ink and substrate systems which themselves best display inherent gloss characteristics. Examples of such systems comprise electrostaticgraphic.

As discussed above, current gloss watermark technology is available where two halftone screens are used to create two different gloss levels in halftone structures with similar sizes and shapes, but different polarization directions. Although there may be many different screen combinations which provide desired gloss difference for the watermark effect, matching the color or density appearances of two different halftone structures usually requires two separate color calibrations for two screens. Without proper color calibration, the foreground and background halftone structures corresponding to the two halftone screens may well be distinguishable, not just in gloss difference but also in color and/or density. Even with proper color calibration of an Image Marking Engine (IME), machine defects such as banding, misregistration, or distortion can cause color miss-match for two different halftones.

Figure 5:
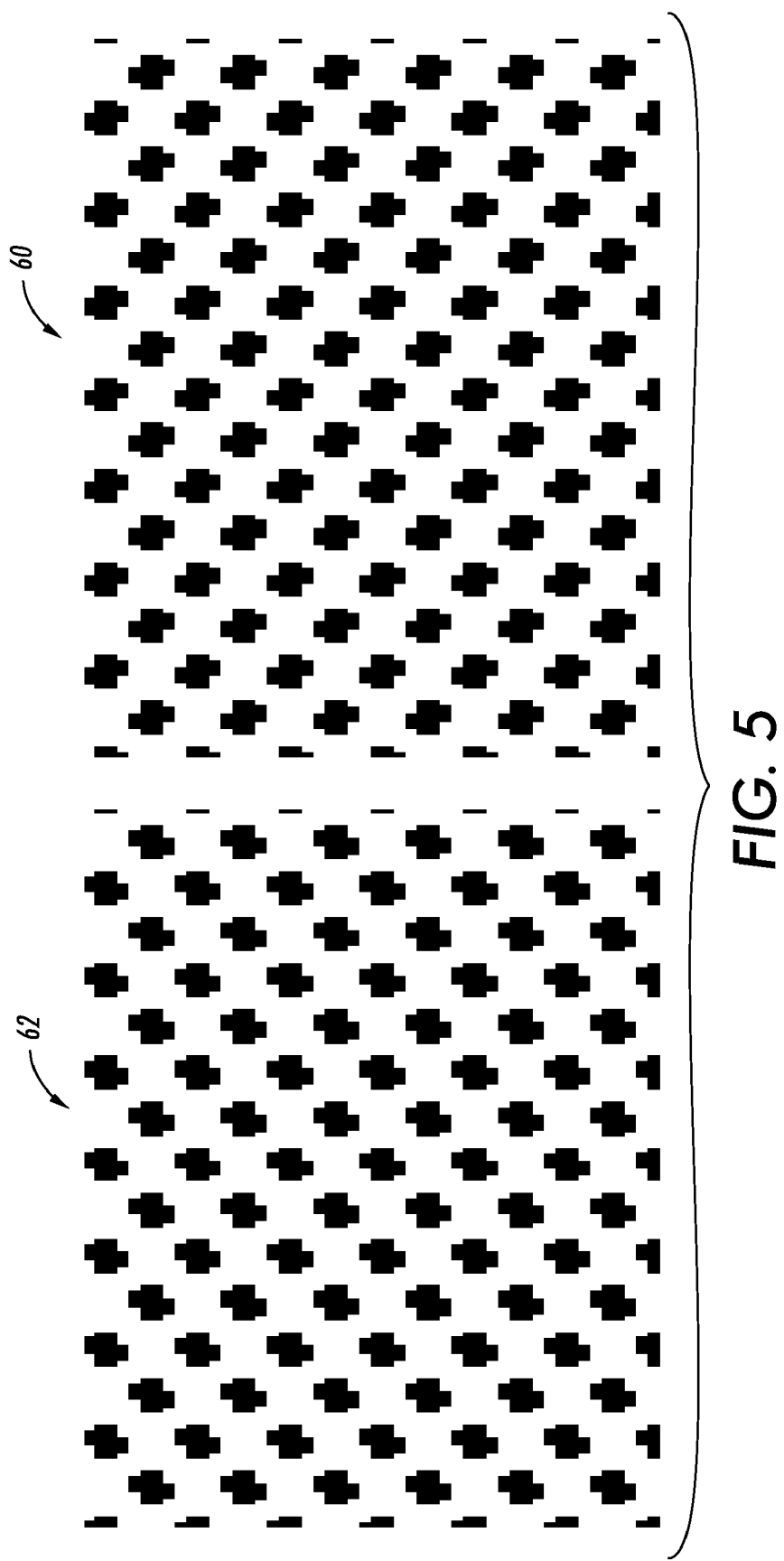
FIG. 5 illustrates foreground (Right) and background (Left) halftone structures defined by two conjugate gloss watermark screens.

Practically, two halftone structures, as shown in FIG. 5, where structures 60 and 62 are mirror images to each other may be the best combination. These two halftone structures not only avoid two color separations, but provide a robust solution for creating gloss watermark images which will be perceived only in gloss difference, not in color and/or density.

The outputs by the halftone gloss watermark embedding technology discussed above are binary images and usually are CMYK binary images in a printer-dependent color space. As with most halftoning processes, the gloss watermark embedding process requires individual color characterization/calibration to achieve a good color reproduction. Moreover, this process can be printer and halftone method dependent. Notably, many printers include hardware halftoning units built inside the IME, whereby modification of the halftoning process is not always accessible and the implementation of a halftoning-based gloss watermark embedding often requires some kind of ad hoc solution for different situations.

This disclosure, and specifically the description which follows, provides methods and systems to embed gloss watermark patterns into a contone B/W or color image with little change to the original color information. The output of this contone embedding method maintains the same color space as the input and is robust to further image processing including compression/decompression and half toning.

Figure 6:
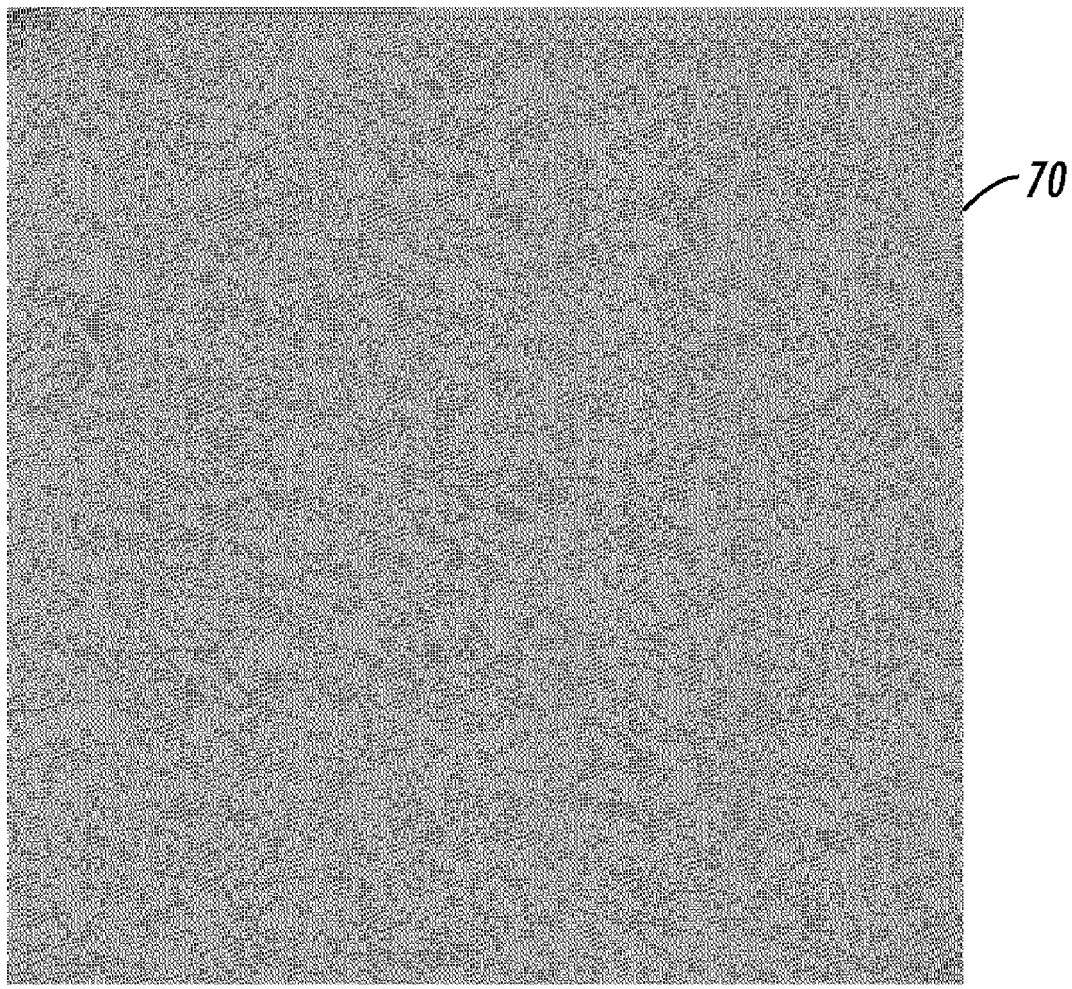
FIG. 6 illustrates a contone image with a constant gray level.
Figure 7:
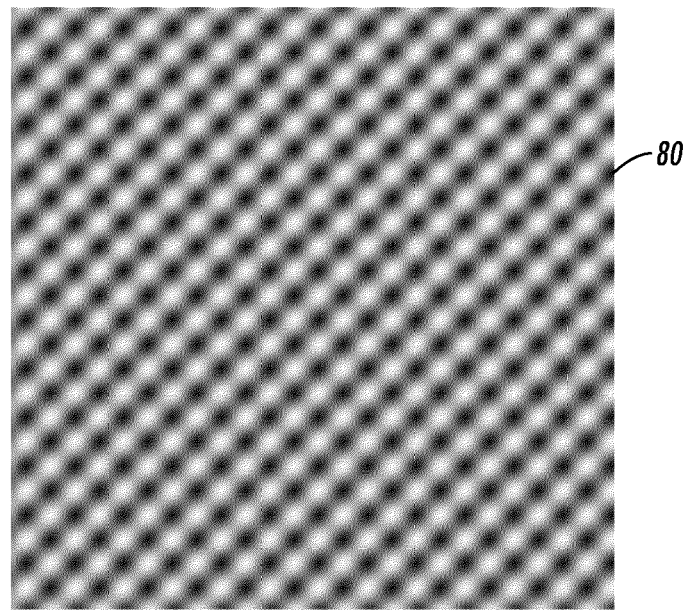
FIG. 7 illustrates a foreground spatial modulation of the contone image of FIG. 6.

The disclosed methods and systems use spatial modulation to modify an input contone image. The modulation is carried in high frequencies, so the color content within the limit of the human visual system has little change. For example, a contone image with a constant gray level 70, as shown in FIG. 6, can be modified by different two-dimensional spatial modulations to output images 80 and 90 shown in FIGS. 7 and 8, respectively. When these pictures are printed in a much higher resolution and an observation is taken at a proper distance, the spatial averaging by a human visual system will provide the illusion of the same continuous gray level as shown in FIG. 6.

Figure 9:
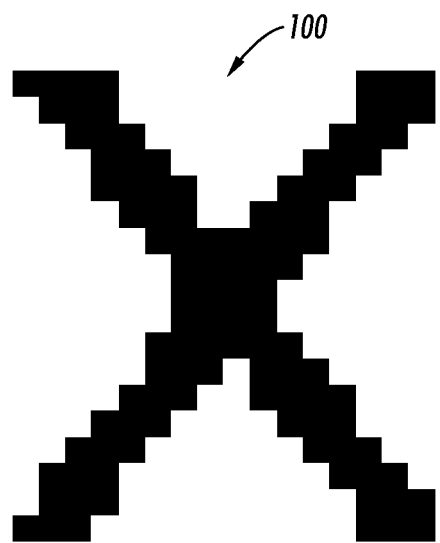
FIG. 9 illustrates a binary patterned image for embedding as a gloss watermark according to one exemplary embodiment of this disclosure.
Figure 10:
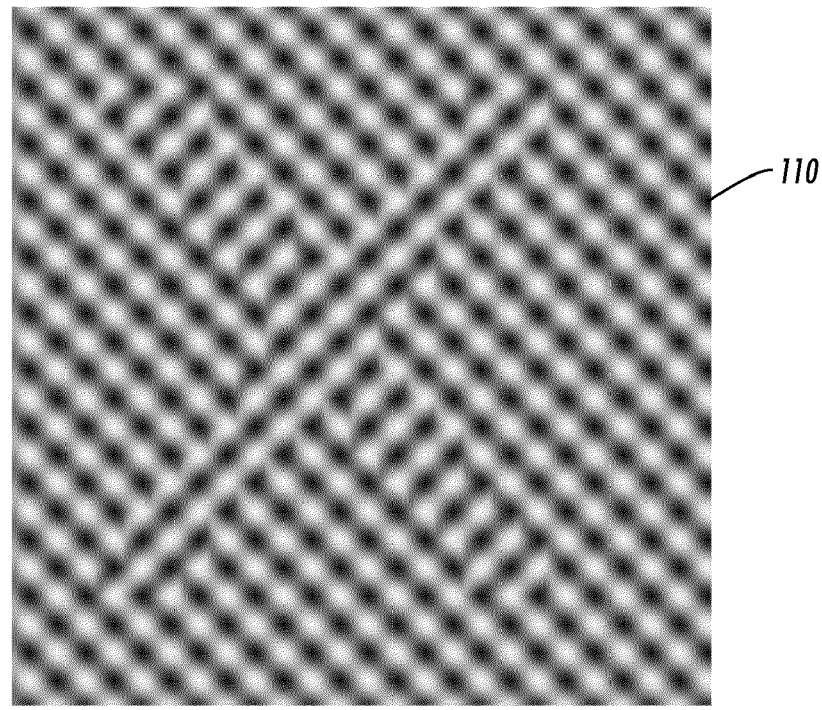
FIG. 10 illustrates the binary patterned image of FIG. 9, embedded as a gloss watermark in a background image, using two spatial modulation with opposite polarizations according to an exemplary embodiment of this disclosure.

The spatial modulations used in the disclosed method and systems are two-dimensional periodical and the results of the modulations for a constant input are similar to the ones by halftone screening, except the output images remain as contone images. The gloss watermark embedding requires using two spatial modulations similar but with opposite polarizations, as is shown by the foreground modulation 80 and the background modulation 90 illustrated in FIGS. 7 and 8, respectively. For example, a binary pattern X 100 shown in FIG. 9 can be embedded into the contone image 70 shown in FIG. 6 using the foreground modulation 80 for the gloss watermark pattern and the background modulation 90 for the remaining area. The result of the embedding is shown in FIG. 10 by an image 110, where the modulation converting a constant gray level to an output with embedded gloss watermark pattern X is in two different contone structures 80 and 90.

The spatial modulations for the gloss watermark embedding can be implemented in different ways. In the experiments completed for preparing this disclosure, the following method was used. The two-dimension spatial modulation are defined as $$g(x,y,g_o)=G(x,y,g_o), \text{if } G \geq 0 \text{ and } G \leq 255,$$

$$g(x,y,g_o)=0, \text{if } G<0.$$

$$g(x,y,g_o)=255, \text{if } G>255, \tag{1}$$

where $g$ ($0 \leq g \leq 255$) is the output of the modulation, $g_o$ is the contone level to match, the function G is given by $$G(x,y,g_o) = p_o(g) + p_A(g_o)\cos[2\pi(f_{Ax}x + f_{Ay}y)] + p_B(g_o)\cos[2\pi(f_{Bx}x + f_{By}y)]$$

In the function G, given above by Eq. (2), x and y are spatial coordinates, $f_A(f_{Ax}, f_{Ay})$ and $f_B(f_{Bx}, f_{By})$ are two spatial frequency vectors defining the two-dimension periodic structure in the modulation and $p_o$, $p_A$ and $p_B$ are modulation parameters as functions of the matched contone level $g_o$. For the purpose of matching the spatial average of modulation output g to the given input contone level $g_o$, the three modulation parameters $p_o$, $p_A$ and $p_B$ are chosen to satisfy the following integration equation $$\int_x \int_y g(x, y, g_o) = \int_x \int_y g_o, \quad (3)$$

where the x and y spatial integration is over the two-dimensional period defined by the two frequency vectors, $f_A(f_{Ax}, f_{Ay})$ and $f_B(f_{Bx}, f_{By})$. For the purpose of gloss watermark embedding, we define $p_A$ and $p_B$ first, and solve the equation (3) to get corresponding $p_o$. Due to the "clipping" feature in the definition of Eq. (1), it is simpler to solve Eq. (3) numerically than analytically.

Figure 8:
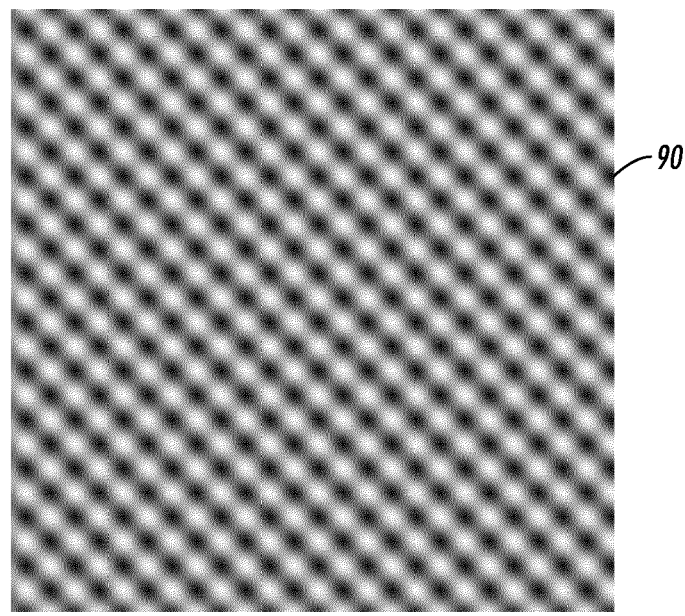
FIG. 8 illustrates a background spatial modulation of the contone image of FIG. 6.
Figure 11:
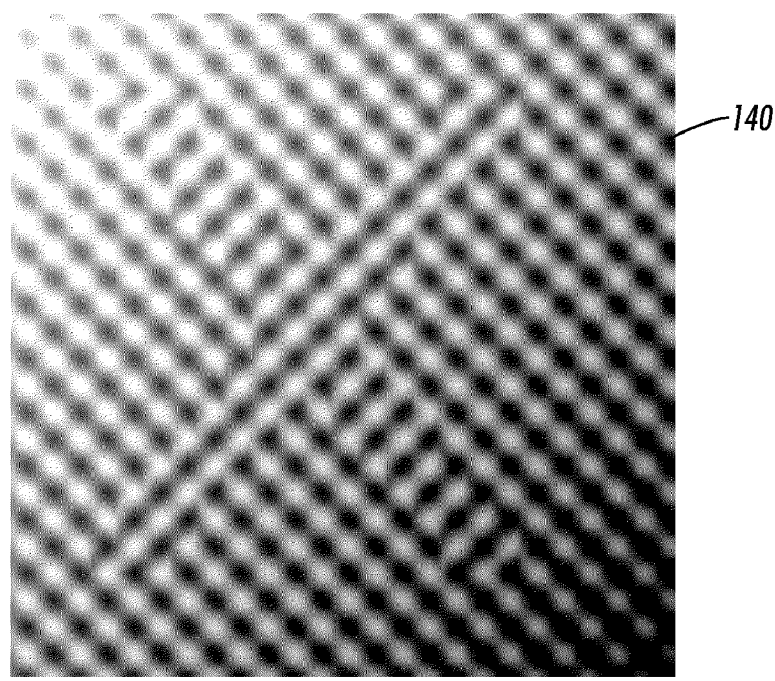
FIG. 11 illustrates a gloss watermark embedded into a background image with varying gray levels according to an exemplary embodiment of this disclosure.

To obtain the desired anisotropic spatial structures for gloss watermark embedding, it is necessary to chose $p_A$ and $p_B$ such that $p_A \neq p_B$. For example, we may define $p_A = 40$ and $p_B = 80$, as two $g_o$ independent parameters, and numerically solve Eq. (3) for $p_o(g_o)$. It is evident that two special solutions of $p_o(g_o)$ are: $p_o(0) = -255$ and $p_o(255) = 510$. With the above chosen frequency vectors $f_A$ and $f_B$ and modulation parameters $p_A$ and $p_B$, a contone image with a constant gray level as shown in FIG. 6 is modulated by Eq. (2) and shown in FIG. 7. On the other hand, we may change the definition of $p_A$ and $p_B$ to $p_A = 80$ and $p_B = 40$, and the modulation output will change the polarization as shown in FIG. 8. Using the two modulations for the watermark and the background respectively, we obtain the result of gloss watermark embedding as shown in FIG. 10. In FIG. 11, the same watermark pattern is embedded into a background with different gray levels resulting in image 140.

Notably, the disclosed embodiments and descriptions thereof, discuss a watermark pattern embedded in a background image. A background image is simply a contone image and the embedded watermark pattern is an area within the contone image, whereby the methods and systems disclosed receive a data representation of the contone image; define a watermark area within the contone image; spatially modulate the data representation of the contone image substantially adjacent the watermark area to produce a data representation of the respective contone image according to a first polarization; and spatially modulate the data representation of the contone image substantially within the watermark area to produce a data representation of the respective contone image according to a second polarization. The resulting image data representation is of the original contone image with an embedded watermark.

As a matter of customary form usage, background image refers to the non-watermark embedded area of the contone image and the foreground image refers to the watermark embedded area of the contone image.

According to one embodiment of this disclosure, the contone image watermarking methods and systems disclosed utilize a first and second polarization for the background and watermark designated areas of the contone image, where the first polarization and second polarization are substantially different in orientations, for example, but not limited to orthogonal orientations.

According to another embodiment of this disclosure, the contone image watermarking methods and systems disclosed may perform one or more, but are not limited to, (1) storing the contone data representation of the contone image with the embedded watermark on a data storage device, for example, a computer hard drive, a computer ram, etc., (2) communicating the contone data representation of the contone image with the embedded watermark to a device, for example, a local server computer, a data modem, etc., (3) further processing the contone data representation of the contone image with the embedded watermark, for example, image enhancement processes, data compression/decompression, protocol formatting for data transmission, etc., and/or (4) rendering the contone data representation of the contone image with the embedded watermark on an image output device, for example, a xerographic printer, a laser printer, an inkjet printer, a fax machine, and/or an image display such as a monitor, which generates a halftone data representation of the contone image and embedded watermark.

According to another embodiment of this disclosure, a contone image watermarking computer program product is disclosed. The computer program product can be stored on a data storage device, for example, a CD, a hard disk, a ram, etc., and executed by a computer instruction processing device which is configured to receive/access the contone image data. The computer instruction processing device can be, for example but not limited to, a DFE, a server, portable/stationary computer, a printing system, and/or any other processor based computing device.

The computer program product includes a computer-usable data carrier storing instructions that, when executed by a processor based device, cause the processor based device to perform a method comprising a computer-usable data carrier storing instructions that, when executed by a computer, cause the computer to perform a method comprising: receiving a data representation of a contone image; defining a watermark area within the contone image; spatially modulating the data representation of the contone image substantially adjacent the watermark area to produce a data representation of the respective contone image according to a first polarization; and spatially modulating the data representation of the contone image substantially within the watermark area to produce a data representation of the respective contone image according to a second polarization, thereby producing a contone data representation of the contone image with an embedded watermark.

According to another embodiment of the computer program product, the first and second polarizations associated with the respective contone image substantially adjacent the watermark area and the contone image substantially within the watermark area, are substantially different in orientations, for example, but not limited to orthogonal orientations.

According to another embodiment of the disclosed computer program product, the method performed by the processor executed instructions, further includes performing one or more of rendering the contone image with the embedded watermark to generate halftoned images, storing the contone data representation of the contone image with the embedded watermark, communicating the contone data representation of the contone image with the embedded watermark to a device, and further processing the contone data representation of the contone image with the embedded watermark.

According to another embodiment of the disclosed computer program product, the step of spatially modulating the data representations of the contone image comprises spatially modulating the data representation of the contone image according to $$G(x,y,g_o) = p_o(g_o) + p_A(g_o)\cos[2\pi(f_{Ax}x + f_{Ay}y)] + p_B(g_o)\cos[2\pi(f_{Bx}x + f_{By}y)]$$

where $g(x,y,g_o) = G(x,y,g_o)$, if $G \geq 0$ and $G \leq 255$, $g(x,y,g_o) = 0$, if $G < 0$, $g(x,y,g_o) = 255$, if $G > 255$, and $p_o$, $p_A$ and $p_B$ are selected to satisfy $$\int_x\int_y g(x,y,g_o) = \int_x\int_y g_o.$$

According to another embodiment of the disclosed computer program product, the method performed by the processor executed instructions includes generating a halftone data representation of the contone data representation of the contone image and embedded watermark, and communicating the halftone data representation to an image output device.

Figure 12:
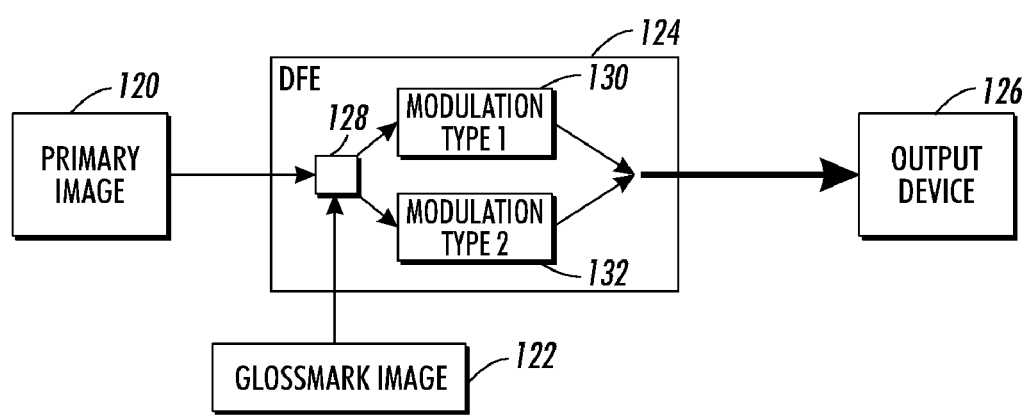
FIG. 12 is a block diagram of a system to produce a contone gloss watermark image embedded in a contone background image according to an exemplary embodiment of this disclosure.

With reference to FIG. 12, illustrated is a block diagram of one embodiment of a system to produce a contone gloss watermark image embedded in a contone background image according to one exemplary embodiment of this disclosure. Here, a primary image 120 is received as input data to a digital front-end (DFE) 124 and a desired glossmark image area 122 is received as input data to the DFE 124 as well. The processed image with an embedded contone gloss watermark is sent to an output device 126 in gray-scale, the density being driven by the primary image 120 data. However, the modulation type selection is driven by the intended glossmark image area data 122 as input to multiplexer switch 128. The intended glossmark image area data 122 will serve to direct at least a portion of the primary image 120 to use a first anisotropic structured modulation 130 while directing an alternative modulation 132 to be used for the remainder of primary image 120. As will be understood by those skilled in the art, the intended glossmark image area data 122 may be flattened into simple zero and one pixel data representations if needed in the DFE 124. This pattern of zeroes and ones are then used to toggle the multiplexer 128 to one contone anisotropic structure orientation type or the other. Multiplexer 128 therefore toggles between either type 1 modulation 130 or type 2 modulation 132, as dictated by the desired glossmark area data 122, to produce a data composite result as passed to an output device 126. In this way, a watermark pattern defined by the glossmark image area data 122 is embedded into the primary image 120 which can be perceived as a gloss differential glossmark after the resulting contone image is printed in the output device 126.

According to another embodiment of the disclosed contone image watermarking system, as described herein and further described with reference to FIG. 12, a printing system is provided which embeds a watermark into a contone image. The printing system includes one or more image marking engines; and one or more controllers operatively connected to the one or more image marking engines, wherein at least one controller, at least one image marking engine, or a combination thereof, are programmed to perform the methods of embedding a watermark into a contone image disclosed herein.

In summary, by alternating between two contone modulation types, carefully selected such that each has identical matching density characteristics while displaying distinctly different anisotropic structure orientations will enable the generation of a contone glossmark image. Moreover, the contone image may be processed to produce a halftone raster output for printing without the need for special toners or paper. This manipulation of gloss differentials may, of course, be best produced with toner/ink and substrate systems which themselves best display inherent gloss characteristics. Examples of such systems comprise electrostaticgraphic and quality ink-jet systems.

For different embedding requirements, the modulation can be varied with different selections of $p_A$ and $p_B$, a few examples are shown below in FIGS. 13-15.

Figure 13:
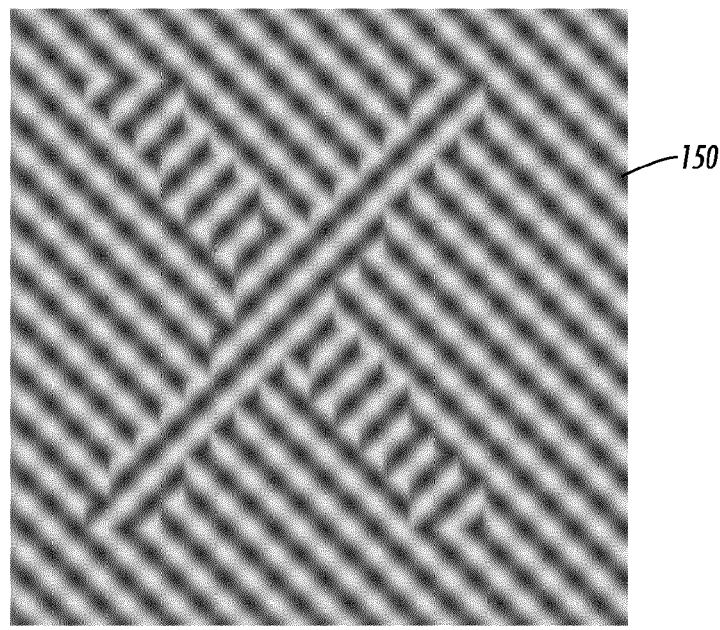
FIG. 13 illustrates a gloss watermark embedded in a background image with $p_A=20$ and $p_B=80$ for the watermark and $p_A=80$ and $p_B=20$ for the background, according to an exemplary embodiment of this disclosure.

With reference to FIG. 13, illustrated is a contone image 150 with a glossmark embedded in a background image with $p_A=20$ and $p_B=80$ for the watermark and $p_A=80$ and $p_B=20$ for the background.

Figure 14:
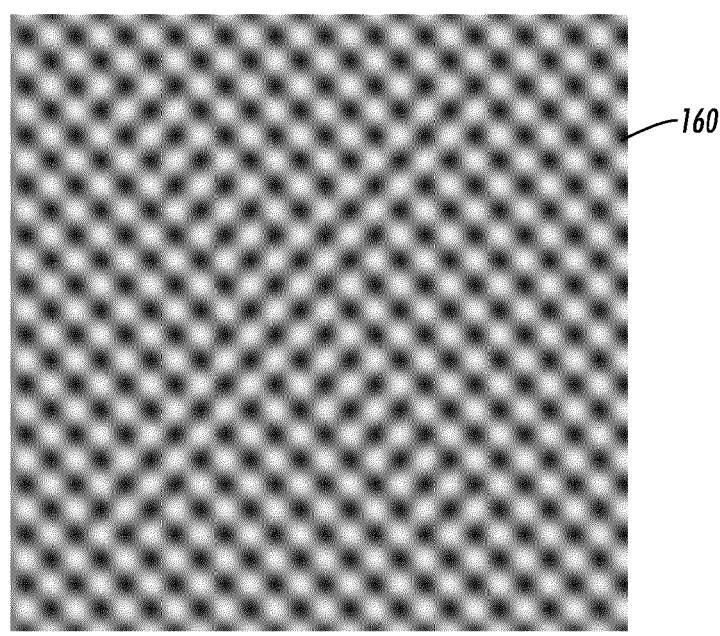
FIG. 14 illustrates a gloss watermark embedded in a background image with $p_A=50$ and $p_B=70$ for the watermark and $p_A=70$ and $p_B=50$ for the background, according to an exemplary embodiment of this disclosure.

With reference to FIG. 14, illustrated is a contone image 160 with a glossmark embedded in a background image with $p_A=50$ and $p_B=70$ for the watermark and $p_A=70$ and $p_B=50$ for the background.

Figure 15:
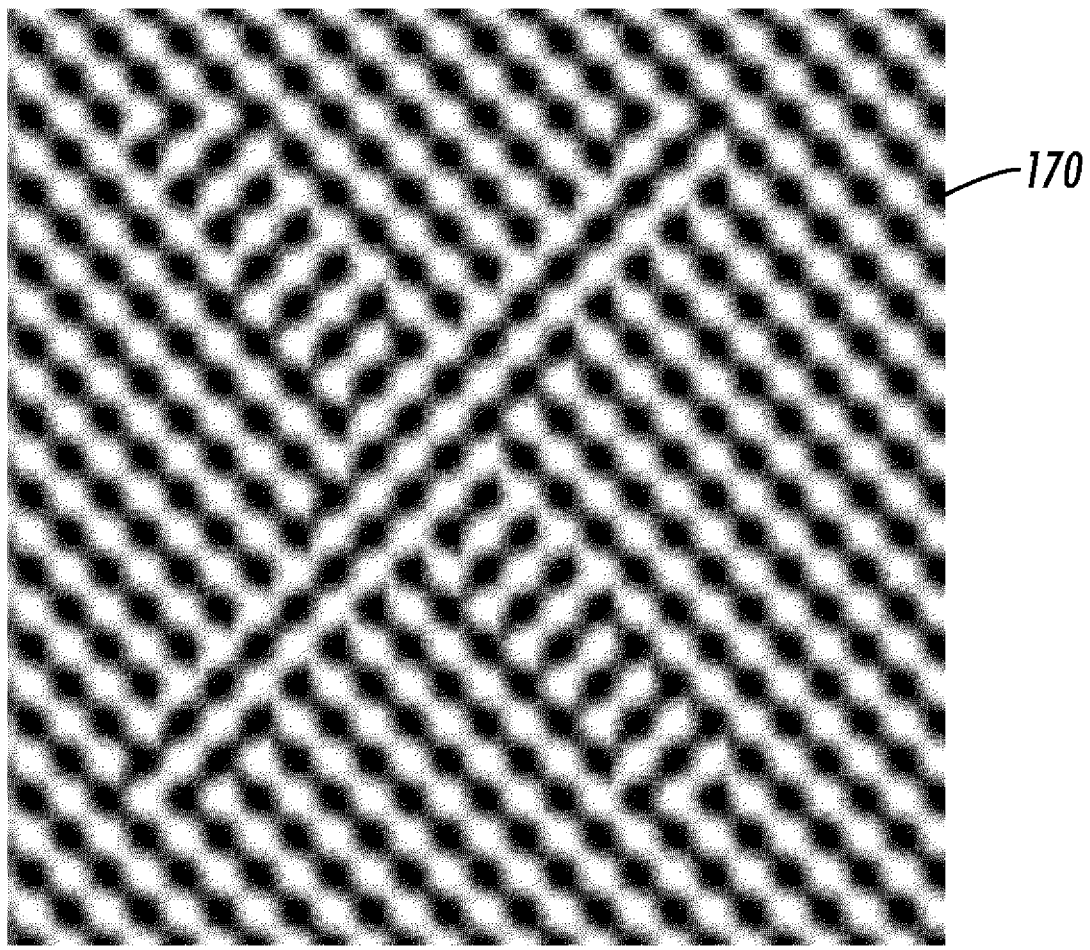
FIG. 15 illustrates a gloss watermark embedded in a background image with $p_A=90$ and $p_B=180$ for the watermark and $p_A=180$ and $p_B=90$ for the background, according to an exemplary embodiment of this disclosure.

With reference to FIG. 15, illustrated is a contone image 170 with a glossmark embedded in a background image with $p_A=90$ and $p_B=180$ for the watermark and $p_A=180$ and $p_B=90$ for the background.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of operating a printing system, the printing system including one or more controllers configured to perform a method of embedding a watermark into a contone image comprising:

receiving a contone data representation of an image;

defining a watermark area within the contone data representation of the image;

spatially modulating the contone data representation of the image substantially adjacent the watermark area to produce a contone data representation of the image substantially adjacent the watermark area according to a first polarization; and spatially modulating the contone data representation of the image substantially within the watermark area to produce a contone data representation of the image substantially within the watermark area according to a second polarization, thereby producing a contone data representation of the image with an embedded watermark, wherein the steps of spatially modulating the contone data representation of the image substantially adjacent the watermark area of the image and substantially within the watermark area comprises:

spatially modulating the contone data representation of the image according to $$G(x,y,g_o) = p_o(g_o) + p_A(g_o)\cos[2\pi(f_{Ax}x + f_{Ay}y)] + p_B(g_o)\cos[2\pi(f_{Bx}x + f_{By}y)]$$

where $g(x,y,g_o) = G(x,y,g_o)$, if $G \geq 0$ and $G \leq 255$, $g(x,y,g_o)=0$, if $G<0$, $g(x,y,g_o)=255$, if $G>255$, and $p_o$, $p_A$ and $p_B$ are selected to satisfy $$\int_x \int_y g(x, y, g_o) = \int_x \int_y g_o.$$

2. The method according to claim 1, wherein the first polarization and the second polarization are substantially different in orientations.

3. The method according to claim 2, wherein the first polarization and the second polarization are orthogonal.

4. The method according to claim 1, further comprising:
performing one or more of rendering the contone data representation of the image with the embedded watermark, storing the contone data representation of the image with the embedded watermark, communicating the contone data representation image with the embedded watermark to a device, and further processing the contone data representation of the image with the embedded watermark.

5. The method according to claim 1, further comprising:
rendering the contone data representation of the image and embedded watermark.

6. The method according to claim 5, further comprising:
generating a halftone data representation of the contone data representation of the image and embedded watermark for an image output device.

7. The method according to claim 6, further comprising:
communicating the halftone data representation to an image output device.

8. A computer program product comprising:
a non-transitory computer-usable data carrier storing instructions that, when executed by a computer, cause the computer to perform a method comprising:
receiving a contone data representation of an image;
defining a watermark area within the contone data representation of the image;
spatially modulating the contone data representation of the image substantially adjacent the watermark area to produce a contone data representation of the image substantially adjacent the watermark area according to a first polarization; and
spatially modulating the contone data representation of the image substantially within the watermark area to produce a contone data representation of the image substantially within the watermark area according to a second polarization, thereby producing a contone data representation of the image with an embedded watermark, wherein the steps of spatially modulating the contone data representation of the image substantially adjacent the watermark area of the image and substantially within the watermark area comprises:
spatially modulating the contone data representation of the image according to $G(x,y,g_o)=p_o(g_o)+p_A(g_o)\cos[2\pi(f_{Ax}x+f_{Ay}y)]+p_B(g_o)\cos[2\pi(f_{Bx}x+f_{By}y)]$ where $g(x,y,g_o)=G(x,y,g_o)$, if $G\geq 0$ and $G\leq 255$, $g(x,y,g_o)=0$, if $G<0$, $g(x,y,g_o)=255$, if $G>255$, and $p_o$, $p_A$ and $p_B$ are selected to satisfy $$\int_x \int_y g(x, y, g_o) = \int_x \int_y g_o.$$

9. The computer program product according to claim 8, wherein the first polarization and the second polarization are substantially different in orientations.

10. The computer program product according to claim 9, wherein the first polarization and the second polarization are orthogonal.

11. The computer program product according to claim 8, the method further comprising:
performing one or more of rendering the contone data representation of the image with the embedded watermark, storing the contone data representation of the image with the embedded watermark, communicating the contone data representation of the image with the embedded watermark to a device, and further processing the contone data representation of the image with the embedded watermark.

12. The computer program product according to claim 8, the method further comprising:
generating a halftone data representation of the contone data representation of the image and embedded watermark.

13. The computer program product according to claim 12, the method further comprising:
communicating the halftone data representation to an image output device.

14. A printing system comprising:
one or more image marking engines; and
one or more controllers operatively connected to the one or more image marking engines, wherein at least one controller or at least one image marking engine, or a combination of at least one controller and at least one image marking engine is configured to perform the method of claim 1.

15. The printing system according to claim 14, wherein the first polarization and the second polarization are substantially different in orientations.

16. The printing system according to claim 14, wherein the first polarization and the second polarization are orthogonal.

17. The printing system according to claim 14, wherein at least one controller or at least one image marking engine or a combination of at least one controller and at least one image marking engine is configured to perform the method of claim 4.

18. The printing system according to claim 14, wherein at least one controller or at least one image marking engine or a combination of at least one controller and at least one image marking engine is configured to perform the method of claim 5.

19. The printing system according to claim 18, wherein one or more image marking engines render the contone data representation of the image with the embedded watermark.

* * * * *